SELF-QUENCHING NEGATIVE RESISTANCE SUPERREGENERATIVE DIODE DETECTOR

Filed April 1, 1966

Inventor:
Robert L. Watters,
by Marvin Snyder
His Attorney.

United States Patent Office 3,434,063
Patented Mar. 18, 1969

3,434,063
SELF-QUENCHING NEGATIVE RESISTANCE SUPERREGENERATIVE DIODE DETECTOR

Robert L. Watters, Schenectady, N.Y., assignor to General Electric Company, a corporation of New York Filed Apr. 1, 1966, Ser. No. 539,466
U.S. Cl. 329—205 13 Claims
Int. Cl. H03d *1/10*

ABSTRACT OF THE DISCLOSURE

A self-quenching superregenerative detector employing a tunnel diode in series with both a parallel resonant circuit tuned to a high radio frequency, and a resistance. Incoming radio frequency signals are inductively coupled to the tuned circuit. An inductance and a bias means are connected in shunt with the resistance and produce relaxation oscillations of the tunnel diode at a considerably lower frequency than the frequency at which the tuned circuit resonates. The relaxation oscillations, which vary in frequency in accordance with amplitude of the received radio frequency signal, comprise the quench signal.

Figure 1:
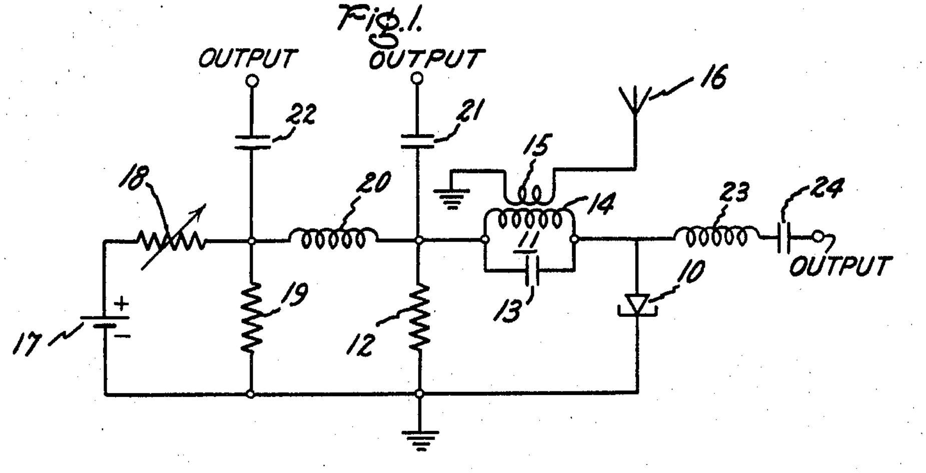

This invention relates to detector circuits, and more particularly to superregenerative detector circuits utilizing negative resistance diodes.

A superregenerative detector generally comprises a modulator which periodically generates bursts of oscillations that can be influenced by an incoming radio frequency signal. From these bursts of oscillations, the modulating signal may be reconstructed. For example, the output signal produced by the detector of the instant invention comprises bursts of oscillations at the received signal frequency which occur at a repetition rate determined by amplitude of the received signal. The repetition rate of these bursts may then be utilized to recover the modulation envelope of the incoming wave. Additional detail regarding applications of super-regenerative receivers may be obtained from Super-Regenerative Receivers by J. R. Whitehead, Cambridge University Press, 1950.

The bursts of high frequency oscillations produced by superregenerative detectors usually occur at a supersonic frequency rate. Thus a "quench" signal, comprising pulses occurring at the supersonic frequency rate, drives the circuit into high frequency oscillation with each quench pulse. The high frequency oscillations build up from noise voltages if no incoming signal is present; however, in the presence of an incoming signal, the high radio frequency oscillations build up more rapidly from this received signal. Hence, the bursts of high radio frequency oscillations occur more frequently when an incoming signal is received, than when only noise is present at the input. Thus, although the total area under the envelope of each burst of oscillation is essentially constant whether in the presence of a received signal or in the absence thereof, the bursts occur at a frequency which varies in accordance with amplitude of received signal. These bursts are used to construct an output signal which varies in accordance with amplitude of the received signal. Between quench pulses, the high radio frequency oscillations completely die out.

Since oscillators have a tendency to radiate the signal generated therein, which may result in radio interference, it is advantageous to minimize this radiaton by utilizing a superregenerative detector of low power. A negative resistance diode, such as a tunnel diode, is well suited to this purpose. Moreover, such diode not only is capable of operating at high frequencies ranging far into the microwave region, but also facilitates construction of a simple and yet highly sensitive detector with self-quenching means. The self-quenching means comprises internal circuitry for generating quench pulses, eliminating all need for reliance upon an external source of quench pulses.

Accordingly, one object of the invention is to provide a highly sensitive self-quenching superregenerative detector for operating at high radio frequencies into the microwave region.

Another object is to provide a miniaturized low power superregenerative detector utilizing a negative resistance diode.

Another object is to provide an extremely simple, self-quenched superregenerative detector including two oscillating circuits of different frequency driving a single tunnel diode.

Briefly, in accordance with a preferred embodiment of the invention, a self-quenched superregenerative detector is provided comprising a first series circuit capable of oscillating at a high radio frequency rate and including negative resistance diode means, resonant circuit means and resistance means. A second series circuit, including inductance means and bias means, is connected in shunt with the resistance means. Means are provided for coupling a received signal to the first series circuit, and output means responsive to the oscillations produce a signal comprising bursts of the high radio frequency occurring at a low radio frequency rate.

Figure 2:
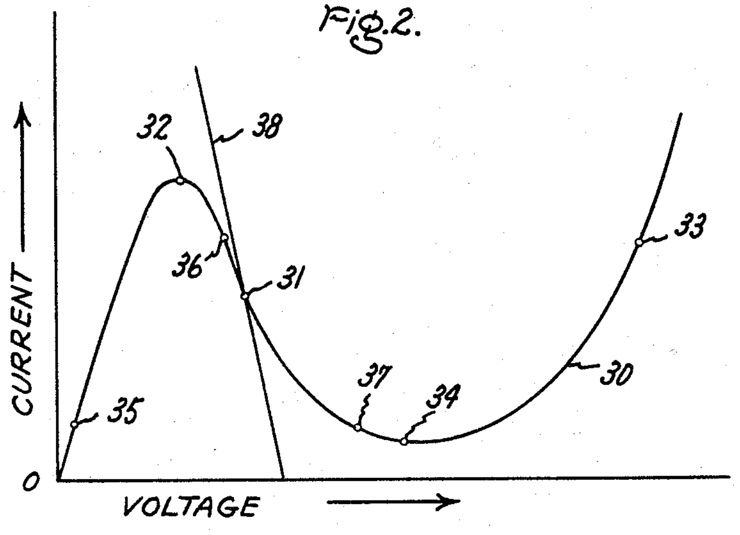

The feaures of the invention believed to be novel are set forth with particularly in the appended claims. The invention itself, however, both as to organization and method of operation, together with further objects and advantages thereof may best be understood by reference to the following description taken in conjunction with the accompanying drawing in which:

FIGURE 1 is a schematic diagram of the novel superregenerative detector in a preferred embodiment; and FIGURE 2 is a characteristic curve for the diode of FIGURE 1, used to assist in describing the invention.

In FIGURE 1, a negative resistance diode, such as a tunnel diode 10, is connected in series with a resonant circuit 11 and a resistance 12. Resonant circuit 11 is shown as a parallel resonant circuit comprising a capacitance 13 connected across the secondary winding 14 of a transformer having a primary winding 15. Incoming signals may conveniently be received at an antenna 16 connected to transformer primary winding 15.

Forward bias for diode 10 is supplied from a power supply 17 through a voltage dividing network comprising series-connected resistances 18 and 19, to an inductance 20, which is connected to the junction of resonant circuit 11 and resistance 12. Resistance 18 is preferably variable. Output signals are produced at the junction common to resonant circuit 11, resistance 12 and inductance 20, and are supplied through a blocking capacitor 21. Resonant circuit 11 is tuned to the frequency of a signal desired to be received. Alternatively, output signals may be supplied through a blocking capacitor 22 from the junction of resistance 19 and inductance 20, or through a series-connected inductance 23 and blocking capacitor 24 from across tunnel diode 10. In the latter instance, inductor 23 is necessary in order to prevent the high frequency oscillations from appearing in the output signal.

In operation, resistances 18 and 19 are selected so that diode 10 is biased in the negative resistance portion of its characteristic curve 30. Thus, as shown in FIGURE 2, DC load line 38 for the circuit of FIGURE 1 intersects curve 30 at a single point 31. Those skilled in the art will recognize that bias of this nature permits the tunnel diode to oscillate. Thus, voltage supplied by power supply means 17 moves the operating point of tunnel diode 10 from zero to a point 32 along the diode characteristic. At this point, the absolute value of the positive resistance of resistance 12 and the resonant impedance of circuit 11 (which is high in comparison with resistance 12) connected in series across tunnel diode 10 approaches the absolute value of the negative resistance of the tunnel diode. Therefore the operating point of the tunnel diode moves into its negative resistance region which lies between points 32 and 34, allowing the diode to oscillate. When the operating point of the diode reaches point 36 however, at a time which is essentially determined by the resonant impedance of circuit 11 and the size of resistance 12, the absolute value of the tunnel diode average negative resistance surpasses the absolute value of the positive resistance in shunt therewith. The operating point thus abruptly changes to a point 33 on the high voltage positive resistance portion of diode characteristic 30, and high frequency oscillation ceases.

Since the diode voltage at point 33 is greater than the bias on tunnel diode 10, the operating point decreases along the diode characteristic to a point 34. Presence of resistance 12 in series with resonant circuit 11 connected across tunnel diode 10 prevents the tunnel diode from switching at this time to the low voltage positive resistance portion of diode characteristic 30, since the absolute value of the total positive resistance connected across the tunnel diode is still below the absolute value of the negative resistance of the tunnel diode. Because the diode voltage at point 34 still exceeds the bias on the tunnel diode, the operating point of the tunnel diode moves into its negative resistance region, again allowing the diode to oscillate at the frequency determined by capacitance 13 and inductance 14. When the diode operating point reaches point 37 however, at a time which is determined essentially by the resonant impedance of circuit 11 and the size of resistance 12, the absolute value of the tunnel diode average negative resistance surpasses the absolute value of the positive resistance in shunt therewith. The operating point thus abruptly switches to a point 35 on the low voltage positive resistance portion of diode characteristic 30, and high frequency oscillations cease. At this point, voltage on the tunnel diode is below the bias voltage; hence, the diode voltage again begins to increase. The foregoing abrupt changes in tunnel diode operating point cause relaxation oscillations of the tunnel diode which occur at a considerably lower frequency than the oscillations at the frequency to which resonant circuit 11 is tuned.

During the portions of the relaxation periods occurring between points 32 and 36 and points 34 and 37 of the diode characteristic, tuned circuit 11 oscillates at a frequency determined by the values of capacitance 13 and inductance 14. This oscillation occurs at a very high radio frequency rate, far in excess of the variable low radio frequency rate at which relaxation oscillations occur. The relaxation oscillations comprise the quench signal.

In absence of a signal received by antenna 16, tuned circuit 11 oscillates as a result of noise pick-up. However, when a signal at the resonant frequency of tuned circuit 11 is received by antenna 16, the bursts of high radio frequency oscillations occur at a repetition rate dependent upon amplitude of the received signal. For example, if the diode operating point lies between points 32 and 35 on curve 30, close to point 32, and a signal of proper frequency is received at antenna 16, additional voltage is superimposed on diode 10 from tuned circuit 11. Since the received signal frequency greatly exceeds the relaxation oscillation frequency, the positive swings of the received signal may be of sufficient amplitude to repeatedly drive the diode operating point onto the negative resistance portion of curve 30 between points 32 and 36, thereby causing the high frequency oscillations to begin earlier in the relaxation oscillation cycle. In addition, operating point 36 is thereby reached earlier, causing the diode to switch to point 33 earlier.

A similar situation prevails when the diode operating point lies between points 34 and 33 on curve 30, close to point 34. In this instance however, it is negative swings of the received signals which may be of sufficient amplitude to repeatedly drive the diode operating point onto the negative resistance portion of curve 30 between points 34 and 37, causing the high frequency oscillations to begin earlier in the relaxation oscillation cycle, and even causing operating point 37 to be reached earlier which, in turn, causes the diode to switch to point 35 earlier. Thus, the greater the amplitude of received signal, the more frequently the bursts of oscillations occur, due to the greater frequency at which the tunnel diode switches.

It should be noted that the tunnel diode operates through voltage excursions of but a single polarity. Thus, the DC component of voltage at the output terminal is removed by coupling the output signal through blocking capacitor 21, or blocking capacitor 22 or 24, as the case may be. An audio output signal of sufficient amplitude to operate a headset may then be produced from a one-transistor audio amplifier (not shown) coupled to capacitor 21 for example.

One circuit constructed in accordance with the present invention utilized the following circuit parameters, which are given by way of example only:

Diode 10=1 ma. germanium tunnel diode having a 100 ohm negative resistance at the middle of its negative resistance characteristic,
Voltage source 17=1.5 volts,
Resistance 12=300 ohms,
Resistance 19=120 ohms,
Inductance 20=0.82–1.00 millihenries,
Resistance 18=1500 ohms, and
Resonant circuit 11 tuned to about 10 mc., with coil 14 of 3–5 microhenries, capacitance 13 of 15–115 picofarads and coil 15 of a one-turn loop wound on coil 14.

The foregoing describes a highly sensitive self-quenched superregenerative detector for detection of high radio frequency signals. Because the detector includes two oscillating circuits of different frequency driving but a single tunnel diode, the circuit is compact, and radiates little electromagnetic energy.

What I claim as new and desire to secure by Letters Patent of the United States is:

1. A self-quenching superregenerative detector comprising: a first series circuit including negative resistance diode means, resonant circuit means, and resistance means having a terminal at either end thereof, said first series circuit being capable of oscillating at a high radio frequency rate; a second series circuit including inductance means and bias means, said second series circuit being connected at either end thereof to a respective terminal of said resistance means; means coupling a received signal to said first series circuit; and output means responsive to oscillations of said first series circuit for providing a signal comprising bursts of said high radio frequency occurring at a low radio frequency rate.

2. The self-quenching superregenerative detector of claim 1 wherein said resonant circuit means comprises a parallel resonant circuit.

3. The self-quenching superregenerative detector of claim 1 wherein said negative resistance diode means comprises a tunnel diode.

4. The self-quenching superregenerative detector of claim 2 wherein said negative resistance diode means comprises a tunnel diode.

5. The self-quenching superregenerative detector of claim 4 wherein said bias means is connected to supply forward bias to said tunnel diode.

6. A self-quenching superregenerative detector comprising: a first series circuit including negative resistance diode means, resonant circuit means, and first resistance means, said first series circuit means being capable of oscillating at a high radio frequency rate; a second series circuit including inductance means and second resistance means, said second series circuit being connected in shunt with said first resistance means; bias means connected in shunt with said second resistance means; means inductively coupling an input signal to said resonant circuit means; and output means, said output means being coupled to said first series circuit for providing a signal comprising bursts of said high radio frequency occurring at a low radio frequency rate.

7. The self-quenching superregenerative detector of claim 6 wherein said resonant circuit means comprises a parallel resonant circuit.

8. The self-quenching superregenerative detector of claim 6 wherein said negative resistance diode means comprises a tunnel diode.

9. The self-quenching superregenerative detector of claim 7 wherein said negative resistance diode means comprises a tunnel diode.

10. The self-quenching superregenerative detector of claim 9 wherein said bias means is connected to supply forward bias to said tunnel diode.

11. The self-quenching superregenerative detector of claim 6 wherein said output means is coupled to said second series circuit.

12. The self-quenching superregenerative detector of claim 11 wherein said resonant circuit means comprises a parallel resonant circuit and said negative resistance means comprises a tunnel diode.

13. The self-quenching superregenerative detector of claim 12 wherein said bias means is connected to supply forward bias to said tunnel diode.

References Cited

UNITED STATES PATENTS 3,158,027 11/1964 Kibler.
3,189,828 6/1965 Chang ............ 325—451

OTHER REFERENCES

Jordan et al.: "Esaki Diodes as Super-Regenerative Detectors," Proc. of the IRE, p. 1902, November, 1960.

Bogusz et al.: "Superregenerative Circuits Using Tunnel Diodes," 1961 Inter. Solid State Ckts. Conf. (U. of Pa.), pp. 102–103, Feb. 17, 1961.

Burhans: "Pickard's Regenerative Detector," Proc. of the IRE, pp. 1447–1448, September, 1961.

Reindel: "A Tunnel Diode Super-Regenerative Detector," Proc. of the IEEE, p. 1678, November, 1963.

ALFRED L. BRODY, *Primary Examiner.*

U.S. Cl. X.R.

307—322; 331—107; 325—451